(12) United States Patent
Suzuki et al.

(10) Patent No.: US 10,393,048 B2
(45) Date of Patent: Aug. 27, 2019

(54) CONTROL DEVICE FOR INTERNAL COMBUSTION ENGINE

(71) Applicant: TOYOTA JIDOSHA KABUSHIKI KAISHA, Aichi-ken (JP)

(72) Inventors: Kotaro Suzuki, Minamiashigara (JP); Shota Tsukamoto, Mishima (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 232 days.

(21) Appl. No.: 15/635,205

(22) Filed: Jun. 28, 2017

(65) Prior Publication Data

US 2018/0010540 A1 Jan. 11, 2018

(30) Foreign Application Priority Data

Jul. 5, 2016 (JP) .................. 2016-133620

(51) Int. Cl.
  *F02D 41/14* (2006.01)
  *F01N 3/10* (2006.01)
  (Continued)

(52) U.S. Cl.
  CPC ......... *F02D 41/1458* (2013.01); *F01N 3/101* (2013.01); *F02B 23/101* (2013.01); *F02D 41/0255* (2013.01); *F02D 41/1498* (2013.01); *F02D 41/2461* (2013.01); *F02D 41/402* (2013.01); *F02P 5/05* (2013.01); *F02P 17/12* (2013.01); *F02B 2023/106* (2013.01); *F02D 35/023* (2013.01); *F02D 37/02* (2013.01);
  (Continued)

(58) Field of Classification Search
  CPC ........... F02D 2041/389; F02D 41/1458; F02D 41/0255; F02D 41/402; F02P 5/00; F02P 5/04; F02P 5/14; F02P 5/145; F02P 5/1455; F02P 5/15; F02P 5/1502; F02P 5/151; F02P 5/1514; F02B 23/101; F01N 3/101
  See application file for complete search history.

(56) References Cited

U.S. PATENT DOCUMENTS

2004/0244366 A1* 12/2004 Hiranuma ............ F02D 41/029
                                                                    60/286
2009/0145115 A1*  6/2009 Torisaka ............... F01N 3/0253
                                                                    60/286
(Continued)

FOREIGN PATENT DOCUMENTS

JP    2006-052687 A    2/2006
JP    2008-190511 A    8/2008
(Continued)

*Primary Examiner* — Patrick D Maines
(74) *Attorney, Agent, or Firm* — Hauptman Ham, LLP

(57) ABSTRACT

A control device is configured to perform, when it is estimated that a combustion fluctuation increases, estimation related to an ignition delay for initial flame generated from a discharge spark and an air-fuel mixture containing fuel spray injected by intake stroke injection. When it is estimated that the ignition delay for the initial flame is increased from that before the increase in the combustion fluctuation, an injection amount in expansion stroke injection is reduced in a next time cycle. When it is estimated that the ignition delay for the initial flame is reduced from that before the increase in the combustion fluctuation, the injection amount in expansion stroke injection is increased in a next time cycle.

3 Claims, 8 Drawing Sheets

(51) Int. Cl.
  *F02B 23/10*  (2006.01)
  *F02D 41/02*  (2006.01)
  *F02D 41/40*  (2006.01)
  *F02P 5/05*  (2006.01)
  *F02D 41/24*  (2006.01)
  *F02P 17/12*  (2006.01)
  *F02D 41/38*  (2006.01)
  *F02P 5/04*  (2006.01)
  *F02P 5/15*  (2006.01)
  *F02P 9/00*  (2006.01)
  *F02D 35/02*  (2006.01)
  *F02D 37/02*  (2006.01)

(52) U.S. Cl.
  CPC ........ *F02D 2041/389* (2013.01); *F02P 5/045* (2013.01); *F02P 5/1502* (2013.01); *F02P 9/002* (2013.01); *Y02T 10/125* (2013.01); *Y02T 10/26* (2013.01); *Y02T 10/44* (2013.01)

(56) References Cited

U.S. PATENT DOCUMENTS

2014/0325963 A1* 11/2014 Nagaoka ............. F02D 41/0245
                   60/274
2016/0319756 A1* 11/2016 Nagaoka ............... F01N 3/0253
2018/0010510 A1* 1/2018 Hayashi ................ F01N 3/2006
2018/0010538 A1* 1/2018 Tsukamoto ........... F02P 5/1523

FOREIGN PATENT DOCUMENTS

JP   2008-202464 A  9/2008
JP   2011-236802 A  11/2011

\* cited by examiner

S100: COOLANT TEMPERATURE < THRESHOLD Tcat?
S102: START CATALYST WARMING-UP CONTROL
S104: IS ENGINE SPEED FLUCTUATION LARGE?
S106: SA-CA2 > THRESHOLD $CD_{0-2}$?
S108: REDUCE INJECTION AMOUNT IN EXPANSION STROKE INJECTION
S110: INCREASE INJECTION AMOUNT IN EXPANSION STROKE INJECTION

CONTROL DEVICE FOR INTERNAL COMBUSTION ENGINE

CROSS-REFERENCE TO RELATED APPLICATION

The present disclosure claims priority under 35 U.S.C. § 119 to Japanese Patent Applications No. 2016-133620, filed on Jul. 5, 2016. The contents of these applications are incorporated herein by reference in their entirety.

TECHNICAL FIELD

The present disclosure relates to a control device for an internal combustion engine and, more particularly, to a control device for controlling an internal combustion engine which includes an injector and a spark plug provided in a combustion chamber, and a catalyst for cleaning an exhaust gas from the combustion chamber (an exhaust gas cleaning catalyst).

BACKGROUND

Some control technologies to promote activation of an exhaust gas cleaning catalyst during an engine warming up process have been proposed for an engine comprising an injector and a spark plug provided in a combustion chamber. For example, JP 2006-052687 A discloses a control device for an internal combustion engine. The internal combustion engine comprises an injector, a spark plug and an exhaust gas cleaning catalyst. The injector is provided substantially at a center of an upper part of a combustion chamber and is configured to inject fuel into a cylinder directly. The spark plug is provided at a portion in the upper part of the combustion chamber where a part of fuel spray from the injector reaches directly. The exhaust gas cleaning catalyst is provided in an exhaust passage. The control device is configured to perform an injection by the injector and an ignition by the spark plug in an expansion stroke to promote the activation of the exhaust gas cleaning catalyst.

The injection and the ignition in the expansion stroke are additionally performed after an injection and a subsequent ignition are performed in an intake stroke or a compression stroke. Specifically, a first time injection and a subsequent first time ignition are performed in the intake stroke or the compression stroke. Then, a second time injection and a subsequent second time ignition are performed in the middle to latter period of the expansion stroke to activate the exhaust gas cleaning catalyst. The second time fuel injection amount is set to be smaller than the first time fuel injection amount, and the second time ignition is performed before the fuel spray injected by the second time injection reaches a wall surface of the combustion chamber. Since a positional relationship between the injector and the spark plug is as described above and the second time ignition is performed at the timing described above, this control device allows almost all of fuel injected by the second time injection to be burned, thereby increasing the exhaust gas temperature.

SUMMARY

The present inventors are considering a control for activating an exhaust gas cleaning catalyst in an engine configuration different from that disclosed in JP 2006-052687 A. The engine configuration under consideration is common to the engine configuration in the same publication in that both of an injector and a spark plug are provided in an upper part of a combustion chamber, and a part of fuel spray from the injector proceeds toward the spark plug. However, the engine configuration under consideration is different from the engine configuration in the same publication in that an electrode part of the spark plug is disposed in an area above a contour surface of a fuel spray pattern which is closest to the spark plug. Furthermore, the engine configuration under consideration is different from the engine configuration in the same publication in that a tumble flow is formed from intake air supplied into the combustion chamber, and the spark plug is disposed on a downstream side of the injector when viewing in a tumble flow direction.

The tumble flow formed in the combustion chamber swirls from the upper part of the combustion chamber downward at an exhaust port side and from a lower part of the combustion chamber upward at an intake port side. The control is being considered assuming such a tumble flow. Specifically, the control under consideration is performed so that first time injection is performed in an intake stroke to allow the fuel spray to swirl together with the tumble flow in the combustion chamber, and a timing of ignition by the spark plug is set to a timing retarded from a compression top dead center. In addition, the control under consideration is performed so that second time injection is performed to overlap its injection period with at least a part of an ignition period. The fuel injected from the injector in a high pressure state forms a low pressure area by entraining air around the fuel (entrainment). Therefore, when the second time injection is performed to overlap its injection period with at least a part of the ignition period, initial flame generated from a discharge spark generated by the spark plug and an air-fuel mixture containing the fuel spray injected in the intake stroke is attracted to the low pressure area formed around the fuel spray proceeding toward the spark plug.

When spot injection such as the above-described second time injection is performed at the timing retarded from the compression top dead center and at a timing advanced from a starting timing of the ignition period, a shape of the fuel spray injected by the spot injection is changeable because of the tumble flow and the in-cylinder pressure. As a result, a concentration of the air-fuel mixture around the spark plug is unstable, and a combustion fluctuation between cycles becomes large. However, if the second time injection is performed to overlap its injection period with at least a part of the ignition period, the initial flame attracted to the above-described low pressure area can be brought into contact with the fuel spray injected by the second time injection, thereby stabilizing the combustion for growing the initial flame to suppress the combustion fluctuation between cycles.

The control under consideration is performed so that an injection amount when a combustion fluctuation rate between cycles becomes smallest is set to an initial value of the above-described second time injection amount by adaptation based on a standard engine configuration. For example, when an amount of protrusion of the spark plug into the combustion chamber is within a range of hardware tolerance, but is smaller than a standard amount of protrusion, the combustion fluctuation between cycles may be large because the intended attraction action cannot be achieved even if the above-described second time injection is performed with the initial value. Even when there is no problem in terms of hardware tolerance, when an ignition environment in the combustion chamber changes and is out of a desired range, for example, the combustion fluctuation between cycles may be large, because the concentration of the air-fuel mixture for generating the above-described initial flame is unstable, the air-fuel mixture resulting from the fuel spray injected in the intake stroke.

The present disclosure addresses the above problems, and an object of the present disclosure is to suppress an increase in a combustion fluctuation between cycles caused by hardware tolerance or an ignition environment change when a control is performed to activate an exhaust gas cleaning catalyst in an engine configuration in which a part of fuel spray from an injector proceeds toward a spark plug located on a downstream side in a tumble flow direction and an electrode part of the spark plug is disposed in an area above a contour surface of a fuel spray pattern which is closest to the spark plug.

A control device for an internal combustion engine according to the present disclosure is a device for controlling an internal combustion engine including: an injector which is provided in an upper part of a combustion chamber and directly injects fuel into a cylinder; a spark plug for igniting an air-fuel mixture in the cylinder using a discharge spark generated by an electrode part, the spark plug being provided in the upper part of the combustion chamber and on a downstream side of the injector in a flow direction of a tumble flow formed in the combustion chamber, and being provided with the electrode part which is located above a contour surface of a fuel spray pattern injected from the injector toward the spark plug; and an exhaust gas cleaning catalyst for cleaning an exhaust gas from the combustion chamber.

In order to activate the exhaust gas cleaning catalyst, the control device is configured to control the spark plug so as to generate the discharge spark in an ignition period retarded from a compression top dead center, and control the injector so as to perform first injection at a timing advanced from the compression top dead center and second injection at a timing retarded from the compression top dead center, the second injection being performed so that an injection period overlaps with at least a part of the ignition period.

The control device further is configured to set to a target air-fuel ratio an in-cylinder air-fuel ratio which is calculated in each cycle in accordance with a sum of an injection amount of the first injection and an injection amount of the second injection whose initial value is fixed, and perform estimation related to a combustion fluctuation between cycles. When it is estimated that the combustion fluctuation between cycles increases, the control device is configured to change a ratio of the injection amount of the first injection and the injection amount of the second injection to the sum in accordance with an index correlated with an ignition delay for the initial flame generated from the discharge spark and the air-fuel mixture containing the fuel spray injected by the first injection.

The initial value of the second injection amount in each cycle is a fixed value to allow at least the initial flame, which is generated from the discharge spark generated by the spark plug and the air-fuel mixture containing the fuel spray injected by the first injection, to be attracted to the fuel spray injected by the second injection and minimize the combustion fluctuation rate between cycles. Under such injection amount conditions, the first injection amount is adjusted to set to the target air-fuel ratio the in-cylinder air-fuel ratio calculated in each cycle in accordance with the total injection amount of the first injection and the second injection, thereby achieving the target air-fuel ratio.

As described above, the combustion fluctuation between cycles becomes large due to the hardware tolerance or the ignition environment change. The control device for an internal combustion engine according to the present disclosure changes, when a result of the estimation related to the combustion fluctuation between cycles shows that the combustion fluctuation between cycles increases, the ratio of the first injection and the second injection to the total injection amount in accordance with the index correlated with the ignition delay for the initial flame. By such a change, the reduction of attraction action caused by the hardware tolerance is complemented, or an unstable concentration of the air-fuel mixture for generating the initial flame caused by the ignition environment change is solved, with the in-cylinder air-fuel ratio being maintained at the target air-fuel ratio.

The control device may estimate, in accordance with the index, whether the ignition delay for the initial flame is reduced from that before the increase in the combustion fluctuation between cycles. When it is estimated that the ignition delay for the initial flame is reduced from that before the increase in the combustion fluctuation between cycles, the control device may change to increase the ratio of the second injection amount to the sum. When it is estimated that the ignition delay for the initial flame is increased from that before the increase in the combustion fluctuation between cycles, the control device may change to reduce the ratio of the second injection amount to the sum.

When the ignition delay for the initial flame is reduced from that before the increase in the combustion fluctuation between cycles, it can be estimated that the concentration of the air-fuel mixture for generating the initial flame is higher than required, or the attraction action is reduced due to the hardware tolerance. When the ignition delay for the initial flame is increased from that before the increase in the combustion fluctuation between cycles, it can be estimated that the concentration of the air-fuel mixture for generating the initial flame is lower than required.

When the ignition delay for the initial flame is reduced from that before the increase in the combustion fluctuation between cycles, the attraction action is enhanced by increasing the ratio of the second injection to the total injection amount. When the ratio of the second injection to the total injection amount is increased, the ratio of the first injection is reduced, thereby lowering the concentration of the air-fuel mixture for generating the initial flame, i.e., suppressing the reduction of attraction action caused by the hardware tolerance or suppressing the increase in the concentration of the air-fuel mixture for generating the initial flame caused by the ignition environment change.

When the ignition delay for the initial flame is increased from that before the increase in the combustion fluctuation between cycles, the ratio of the first injection is increased by reducing the ratio of the second injection to the total injection amount, thereby increasing the concentration of the air-fuel mixture for generating the initial flame, i.e., suppressing the lowering of the concentration of the air-fuel mixture for generating the initial flame caused by the ignition environment change.

When it is estimated that the ignition delay for the initial flame is reduced from that before the increase in the combustion fluctuation between cycles, the control device may determine whether a minimum value of a secondary voltage of the spark plug is smaller than a threshold, the secondary voltage dropping during the ignition period. When determining that the minimum value is smaller than the threshold, the control device may perform the learning of the second injection amount in accordance with the ratio after the second injection amount to the sum is changed. When determining that the minimum value is equal to or larger than the threshold, the control device may not perform the learning of the second injection amount.

Even when it can be estimated that the ignition delay for the initial flame is reduced from that before the increase in the combustion fluctuation between cycles, it cannot be specified that which of the following is caused: the concentration of the air-fuel mixture for generating the initial flame being higher than required, and the attraction action being reduced due to the hardware tolerance.

The minimum value of the secondary voltage of the spark plug, the secondary voltage dropping during the ignition period, is correlated with variation of the attraction action. The attraction action is enhanced as the minimum value becomes smaller. Therefore, when it is estimated that the ignition delay for the initial flame is reduced from that before the increase in the combustion fluctuation between cycles, the cause can be specified by determining using this minimum value. Specifically, when it is determined that the minimum value is smaller than the threshold, it can be specified that the cause of the reduction of the ignition delay for the initial flame is that the attraction action is reduced due to the hardware tolerance. When it is determined that the minimum value is larger than the threshold, it can be specified that the cause is that the concentration of the air-fuel mixture for generating the initial flame is higher than required.

When the cause of the reduction of the ignition delay for the initial flame is that the attraction action is reduced due to the hardware tolerance, it is foreseeable that the attraction action would be weakened not only in this time cycle but also in next time cycle. Therefore, when it is determined the minimum value is smaller than the threshold, the increase in the combustion fluctuation in the next time cycle or later can be suppressed by performing the learning of the second injection amount in accordance with the ratio after the second injection amount is changed. On the other hand, when the cause of the reduction of the ignition delay for the initial flame is that concentration of the air-fuel mixture for generating the initial flame is increased, the high concentration of the air-fuel mixture may be limited to this time cycle. Therefore, when it is determined that the minimum value is larger than the threshold, the second injection in the next time cycle is performed in accordance with the ratio after the second injection amount is changed without performing the learning of the second injection amount, thereby suppressing the increase in the combustion fluctuation in the next time cycle or later.

The control device for an internal combustion engine according to the present disclosure can suppress the increase in the combustion fluctuation between cycles caused by the hardware tolerance or the ignition environment change.

DESCRIPTION OF EMBODIMENTS

Hereinafter, embodiments of the present disclosure are described based on the drawings. Note that common elements in the respective figures are denoted by the same signs, and the duplicated descriptions are omitted. The present disclosure is not limited by the following embodiments.

FIRST EMBODIMENT

A first embodiment of the present disclosure is described with reference to FIGS. 1 to 9.
[Description of System Configuration]

Figure 1:
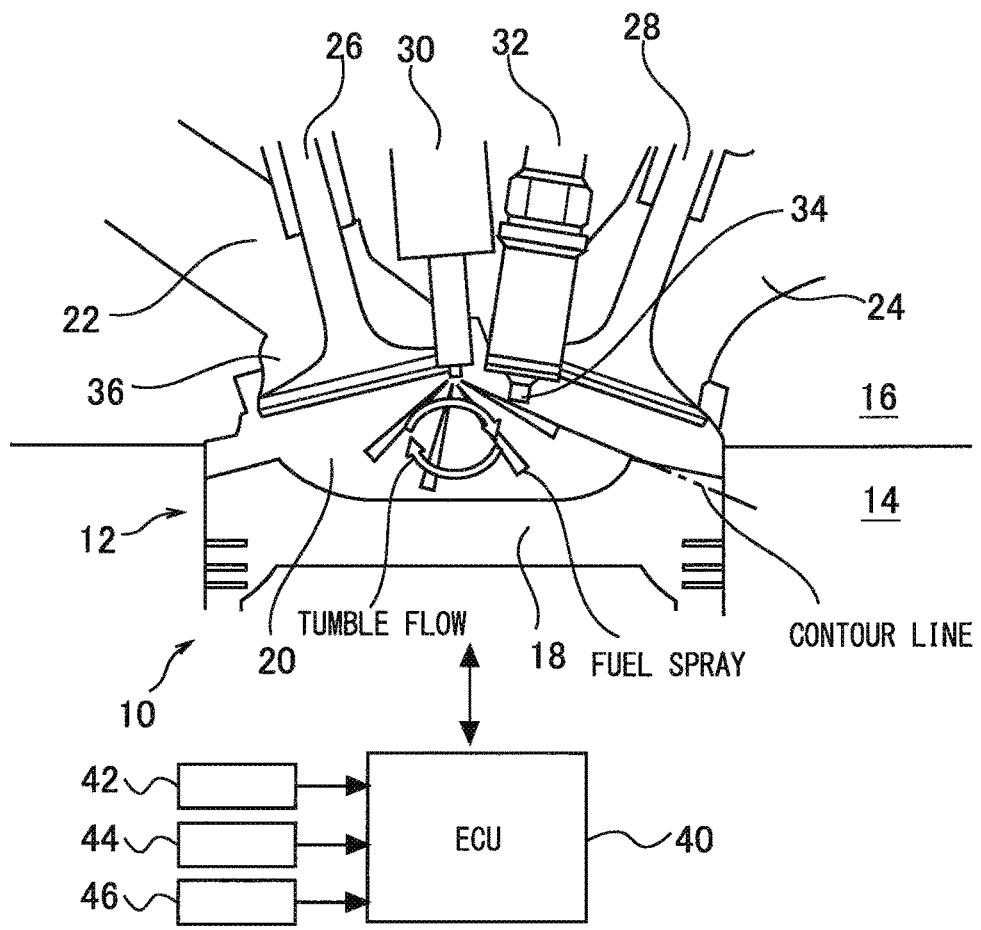
FIG. 1 is a diagram illustrating a system configuration according to a first embodiment of the present disclosure.

FIG. 1 is a diagram illustrating a system configuration according to the first embodiment of the present disclosure. As illustrated in FIG. 1, a system according to the present embodiment includes an internal combustion engine 10 mounted in a vehicle. The internal combustion engine 10 is a four-stroke one-cycle engine. The internal combustion engine 10 has a plurality of cylinders, and one cylinder 12 is illustrated in FIG. 1. The internal combustion engine 10 includes a cylinder block 14 in which the cylinder 12 is formed, and a cylinder head 16 disposed on the cylinder block 14. A piston 18 is disposed in the cylinder 12, the piston 18 reciprocatingly moving in an axial direction of the piston 18 (a vertical direction in the present embodiment). A combustion chamber 20 of the internal combustion engine 10 is defined by at least a wall surface of the cylinder block 14, a bottom surface of the cylinder head 16, and a top surface of the piston 18.

Two intake ports 22 and two exhaust ports 24 which are communicated with the combustion chamber 20 are formed in the cylinder head 16. An intake valve 26 is provided in an opening of the intake port 22 which is communicated with the combustion chamber 20. An exhaust valve 28 is provided in an opening of the exhaust port 24 which is communicated with the combustion chamber 20. An injector 30 is provided in the cylinder head 16 so that a tip of the injector 30 faces the combustion chamber 20 from substantially center of an upper part of the combustion chamber 20. The injector 30 is connected to a fuel supply system including a fuel tank, a common rail, a supply pump, and the like. The tip of the injector 30 has a plurality of injection holes arranged radially. When a valve of the injector 30 is opened, fuel is injected from these injection holes in a high pressure state.

In the cylinder head 16, a spark plug 32 is provided so as to be located on the exhaust valve 28 side of the injector 30 and in the upper part of the combustion chamber 20. The spark plug 32 has an electrode part 34 at a tip thereof, the electrode part 34 including a center electrode and a ground electrode. The electrode part 34 is disposed so as to protrude to an area above a contour surface of a fuel spray pattern (hereinafter also referred to as an "outer spray pattern") injected from the injector 30 (i.e., an area from the outer spray pattern to the bottom surface of the cylinder head 16). More particularly, the electrode part 34 is disposed so as to protrude to the area above the contour surface of the fuel spray pattern which is closest to the spark plug 32 among the fuel spray patterns injected radially from the injection holes of the injector 30. Note that a contour line drawn in FIG. 1 represents the contour surface of the fuel spray pattern which is closest to the spark plug 32 among the fuel spray patterns injected from the injector 30.

The intake port 22 extends substantially straight from an inlet on an intake passage side toward the combustion chamber 20. A flow passage cross-sectional area of the intake port 22 is reduced at a throat 36 which is a connection part with the combustion chamber 20. Such a shape of the intake port 22 generates a tumble flow in intake air which flows from the intake port 22 into the combustion chamber 20. The tumble flow swirls in the combustion chamber 20. More particularly, the tumble flow proceeds from the intake port 22 side to the exhaust port 24 side in the upper part of the combustion chamber 20, and then proceeds from the upper part of the combustion chamber 20 downward at the exhaust port 24 side. The tumble flow proceeds from the exhaust port 24 side to the intake port 22 side in the lower part of the combustion chamber 20, and then proceeds from the lower part of the combustion chamber 20 upward at the intake port 22 side. A recess is formed on the top surface of the piston 18 forming the lower part of the combustion chamber 20 in order to conserve the tumble flow.

As illustrated in FIG. 1, the system according to the present embodiment includes an ECU (Electronic Control Unit) 40 as control means. The ECU 40 includes a RAM (Random Access Memory), a ROM (Read Only Memory), a CPU (Central Processing Unit), and the like. The ECU 40 receives signals from various sensors mounted on the vehicle, and processes the received signals. The sensor includes at least an in-cylinder pressure sensor 42 which is provided in the upper part of the combustion chamber 20, a crank angle sensor 44 which detects a rotation angle of a crankshaft connected to the piston 18, and a temperature sensor 46 which detects a temperature of coolant in the internal combustion engine 10. The ECU 40 processes the signals received from the individual sensors to operate various actuators according to a predetermined control program. The actuator operated by the ECU 40 includes at least the injector 30 and the spark plug 32 described above.

[Starting Control by ECU 40]

In the present embodiment, the control for promoting the activation of an exhaust gas cleaning catalyst (hereinafter also referred to as "catalyst warming-up control") is performed by the ECU 40 illustrated in FIG. 1 immediately after the cold start-up of the internal combustion engine 10. The exhaust gas cleaning catalyst is a catalyst which is provided in an exhaust passage of the internal combustion engine 10. An example of the exhaust gas cleaning catalyst includes a three-way catalyst which cleans nitrogen oxides (NOx), hydrocarbons (HC), and carbon monoxide (CO) in the exhaust gas when the atmosphere of the catalyst in an activated state is near the stoichiometry.

Figure 2:
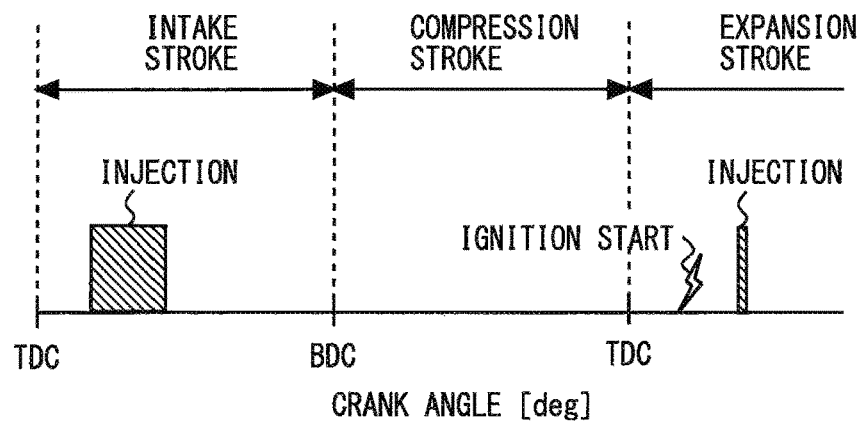
FIG. 2 is a diagram illustrating an outline of a catalyst warming-up control.

The catalyst warming-up control performed by the ECU 40 is described with reference to FIGS. 2 to 7. FIG. 2 illustrates a timing of the injection by the injector 30 and a starting timing of an ignition period of the spark plug 32 (a starting timing of a discharge period of the electrode part 34) during the catalyst warming-up control. As illustrated in FIG. 2, during the catalyst warming-up control, the injector 30 performs first time injection (first injection) in an intake stroke, and then performs second time injection (second injection) with an amount smaller than the first time injection in an expansion stroke after a compression top dead center. Note that, in the following description, the first time injection (first injection) is referred to as "intake stroke injection," and the second time injection (second injection) is referred to as "expansion stroke injection." As illustrated in FIG. 2, during the catalyst warming-up control, the starting timing of the ignition period of the spark plug 32 is set to a timing retarded from the compression top dead center.

Figure 3:
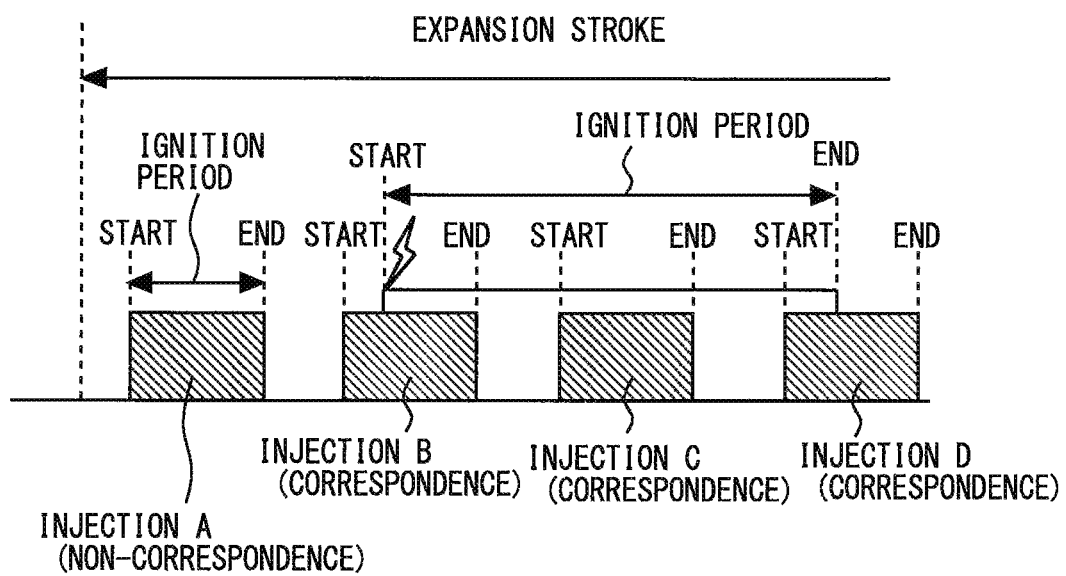
FIG. 3 is a diagram illustrating an expansion stroke injection.

In FIG. 2, the expansion stroke injection is performed at a timing retarded from the starting timing of the ignition period, but the expansion stroke injection may be started at a timing advanced from the starting timing of the ignition period. In this regard, the description is provided with reference to FIG. 3. FIG. 3 is a diagram illustrating a timing relationship between an injection period and an ignition period in the expansion stroke injection. FIG. 3 illustrates four injections A, B, C and D which are started at different timings, respectively. The injections A, B, C and D are started at different timings, respectively, but all injection periods thereof have the same length in the expansion stroke injection. The ignition period illustrated in FIG. 3 is equal to the ignition period during the catalyst warming-up control (setting period). In the present embodiment, the injection B performed during which the ignition period is started, the injection C performed during the ignition period, and the injection D performed during which the ignition period is completed, as illustrated in FIG. 3, correspond to the expansion stroke injection. The injection A performed at a timing advanced from the start timing of the ignition period does not correspond to the expansion stroke injection in the present embodiment. This is because it is necessary that at least a part of the injection period overlaps with the ignition period in the expansion stroke injection in order to achieve an attraction action described later.

[Attraction Action by Expansion Stroke Injection]

Figure 4:
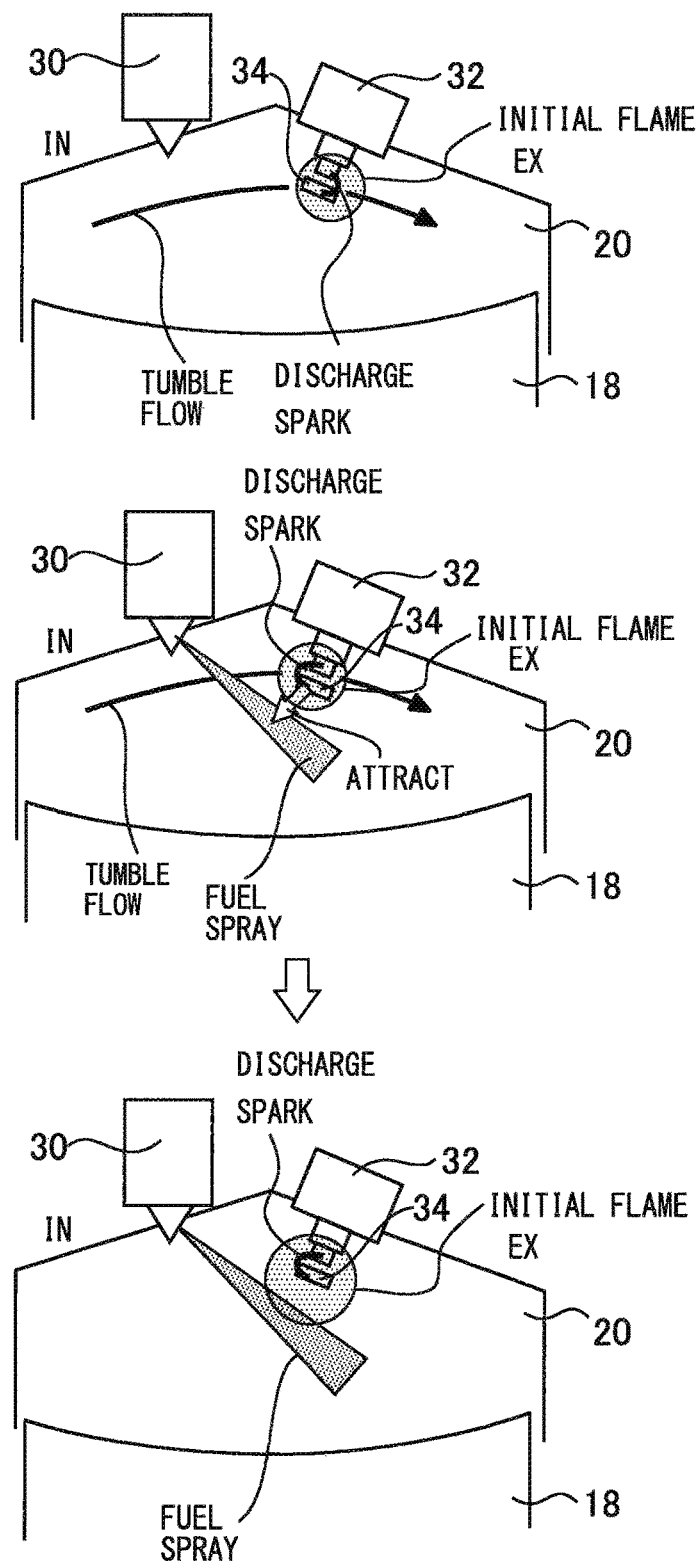
FIG. 4 is a diagram illustrating an attraction action of a discharge spark and initial flame by the expansion stroke injection.

FIG. 4 is a diagram illustrating an attraction action of a discharge spark and initial flame in the expansion stroke injection. An upper part and a middle part (or a lower part) of FIG. 4 illustrate two different states of the discharge spark generated by the electrode part 34 during the ignition period of the spark plug 32 and the initial flame generated from the discharge spark and an air-fuel mixture containing the fuel spray injected by the intake stroke injection, respectively. The upper part of FIG. 4 illustrates a state where the expansion stroke injection is not performed. The middle part (or the lower part) of FIG. 4 illustrates a state where the expansion stroke injection is performed. Note that, for convenience of the description, FIG. 4 illustrates only fuel spray pattern which is closest to the spark plug 32 among fuel spray patterns injected by the expansion stroke injection.

As illustrated in the upper part of FIG. 4, when the expansion stroke injection is not performed, the discharge spark generated by the electrode part 34 and the initial flame extend in a tumble flow direction. On the other hand, as illustrated in the middle part of FIG. 4, when the expansion stroke injection is performed, a low pressure area is formed around the fuel spray (entrainment), and the discharge spark generated by the electrode part 34 and the initial flame are attracted in a direction opposite to the tumble flow direction. Thus, as illustrated in the lower part of FIG. 4, the attracted discharge spark and initial flame are brought into contact with the fuel spray injected by the expansion stroke injection, is entrained in the fuel spray, and grows rapidly. The growth of the initial flame caused by both of the discharge spark and initial flame thus attracted occurs in the injections B and C in illustrated in FIG. 3. The growth of the initial flame in the injection D in FIG. 3 is described later.

The fuel spray injected in the expansion stroke is affected by the tumble flow and the in-cylinder pressure. When the expansion stroke injection is performed at a timing advanced from the starting timing of the ignition period of the spark plug 32 (see the injection A in FIG. 3), the fuel spray injected by this injection changes in its shape before reaching the electrode part 34. As a result, a concentration of the air-fuel mixture around the spark plug is unstable, and a combustion fluctuation between cycles becomes large. However, if the expansion stroke injection is performed so that at least a part of the injection period overlaps with the ignition period (see the injections B, C in FIG. 3), the attraction action illustrated in the middle part of FIG. 4 can be achieved. Even if the fuel spray injected by the expansion stroke injection changes in its shape, the combustion for growing the initial flame (hereinafter also referred to as "initial combustion") can be stabilized, thereby suppressing the combustion fluctuation between cycles. Furthermore, the combustion following the initial combustion or the grown initial flame can stabilize the combustion involving most of the fuel spray injected by the intake stroke injection (hereinafter also referred to as "main combustion"). In the injection D illustrated in FIG. 3, the discharge spark disappears when the ignition period is completed, but the initial flame remains. The attraction action caused by the fuel spray injected by the expansion stroke injection allows the initial flame to be brought into contact with the fuel spray. Accordingly, the initial flame is stabilized similarly to the cases of the injections B, C illustrated in FIG. 3, thereby suppressing the combustion fluctuation between cycles.

[Fuel Injection Amount During Catalyst Warming-Up Control]

Figure 5:
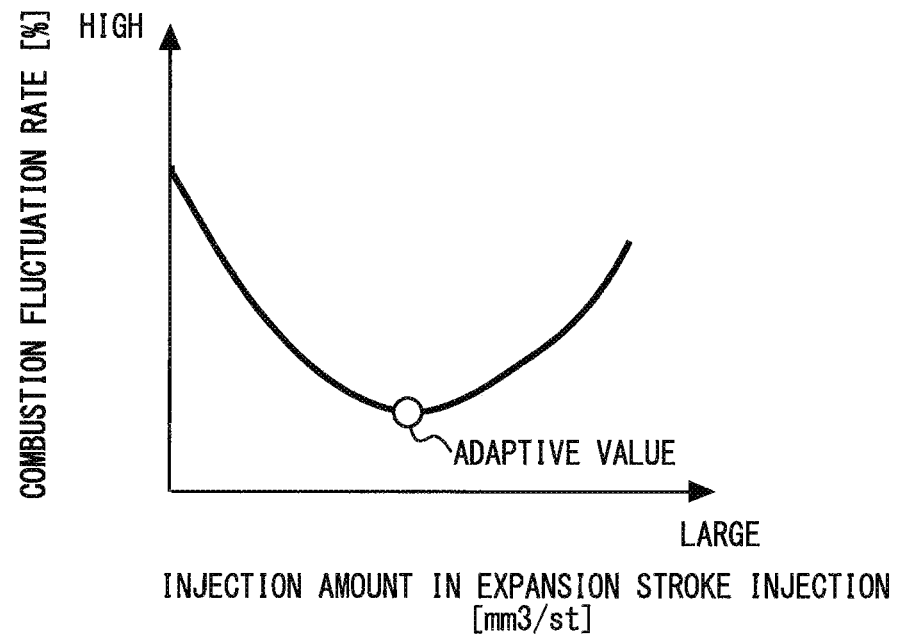
FIG. 5 is a graph showing a relationship between an injection amount in the expansion stroke injection and a combustion fluctuation rate between cycles.

An injection amount in the expansion stroke injection is fixed in each cycle during the catalyst warming-up control. FIG. 5 is a graph showing a relationship between an injection amount in the expansion stroke injection and a combustion fluctuation rate between cycles. The combustion fluctuation rate shown in FIG. 5 is obtained by changing the injection amount in the expansion stroke injection while fixing the injection amount in the intake stroke injection and the starting timing and completion timing of the ignition period. As shown in FIG. 5, a line which indicates the combustion fluctuation rate with respect to the injection amount in the expansion stroke injection is a downward convex line. In the present embodiment, as shown in FIG. 5, the injection amount when the combustion fluctuation rate indicates the smallest value (as an example, about 4 mm³/st) is obtained by adaptation. The obtained injection amount is stored as an initial value in the ROM of the ECU 40, and is read out from the ROM during the catalyst warming-up control.

In each cycle during the catalyst warming-up control, the ECU 40 calculates the total injection amount (i.e., sum of the injection amount in the intake stroke injection and the injection amount in the expansion stroke injection) so as to maintain an in-cylinder air-fuel ratio at a slightly rich air-fuel ratio (as an example, about 14.3). The increase in the fuel fluctuation between cycles caused by the fluctuation of the in-cylinder air-fuel ratio can be suppressed by maintaining the in-cylinder air-fuel ratio at the slightly rich air-fuel ratio. As described above, since the injection amount in the expansion stroke injection is fixed in each cycle during the catalyst warming-up control, calculating the total injection amount so as to maintain the in-cylinder air-fuel ratio at the slightly rich air-fuel ratio means adjusting the injection amount in the intake stroke injection according to an in-cylinder air amount.

[Problem when Combustion Fluctuation Increases]

The above-described initial value (adaptive value) is obtained by adaptation based on a standard engine configuration. For example, when an amount of protrusion of the spark plug 32 into the combustion chamber 20 is within a range of hardware tolerance, but is smaller than a standard amount of protrusion, the combustion fluctuation between cycles may be large because the intended attraction action cannot be achieved. Even when there is no problem in terms of hardware tolerance, when an ignition environment in the combustion chamber 20 changes and is out of a desired range, for example, the combustion fluctuation between cycles may be large, because the concentration of the air-fuel mixture for generating the above-described initial flame is unstable, the air-fuel mixture resulting from the fuel spray injected by the intake stroke injection. In any case, if the combustion fluctuation between cycles becomes large, drivability during the catalyst warming-up control is affected.

Figure 6:
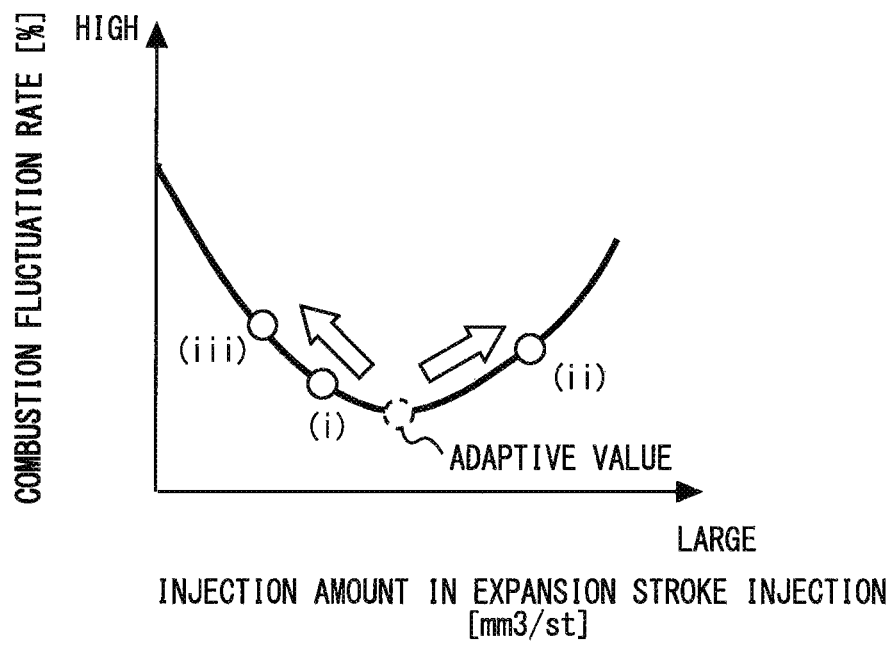
FIG. 6 is a graph showing problems when a combustion fluctuation increases.

These problems are described in detail with reference to FIG. 6. FIG. 6 shows a relationship between the injection amount in the expansion stroke injection and the combustion fluctuation rate between cycles shown in FIG. 5. When the amount of protrusion of the spark plug 32 into the combustion chamber 20 is smaller than the standard amount of projection, a distance between the outer spray pattern and the electrode part 34 is longer than that of the standard engine configuration. Therefore, even if the expansion stroke injection is performed with the initial value (adaptive value), only the attraction action having the same degree as a case of performing the expansion stroke injection with an amount smaller than the initial value (adaptive value) can be achieved actually. As a results, the combustion fluctuation rate becomes high ((i) in FIG. 6).

When the ignition environment in the combustion chamber 20 changes and is out of a desired range, the concentration of the air-fuel mixture for generating the initial flame becomes unstable. This means that the concentration is lower than required or higher than required. Therefore, even if the expansion stroke injection is performed with the initial value (adaptive value), actually, the combustion fluctuation rate is not changed from a case of performing the expansion stroke injection with an amount larger than the initial value (adaptive value) ((ii) of FIG. 6), or the combustion fluctuation rate is not changed from a case of performing the expansion stroke injection with an amount smaller than the initial value (adaptive value) ((iii) of FIG. 6).

[Countermeasures when Combustion Fluctuation Increases]

In the present embodiment, to avoid such a situation, estimation related to the increase in the combustion fluctuation between cycles is performed during the catalyst warming-up control. The estimation related to the increase in the combustion fluctuation between cycles is performed using engine speed fluctuation calculated in accordance with a detection value of the crank angle sensor 44, for example.

In the present embodiment, when it is estimated that the combustion fluctuation between cycles increases, the estimation related to the ignition delay for the initial flame is performed, the initial flame being generated from the discharge spark and the air-fuel mixture containing the fuel spray injected by the intake stroke injection. The estimation related to the ignition delay for the initial flame is performed using a crank angle period CA0-CA2 (hereinafter also referred to as an "SA-CA2") from the ignition timing (i.e., discharge starting timing at the electrode part 34) until a combustion mass ratio (MFB) reaches 2%. Note that a method of calculating the MFB in accordance with an analysis result of in-cylinder pressure data and a method of calculating the SA-CA2 are described in detail in JP 2015-094339 A and JP 2015-098799 A, for example, and the descriptions thereof are omitted in this specification.

In the present embodiment, when it is estimated that the ignition delay for the initial flame is increased from that before the increase in the combustion fluctuation between cycles, the injection amount in the expansion stroke injection is reduced by estimating that the cause of the increase of the ignition delay for the initial flame is that the concentration of the air-fuel mixture for generating the initial flame is lower than required (i.e., in the state described in (ii) of FIG. 6). On the contrary, when it is estimated that the ignition delay for the initial flame is reduced from that before the increase in the combustion fluctuation between cycles, the injection amount in the expansion stroke injection is increased by estimating that the cause of the reduction of the ignition delay for the initial flame is that the concentration of the air-fuel mixture for generating the initial flame is higher than required (i.e., in the state described in (iii) of FIG. 6), or the above-described attraction action is weakened (i.e., in the state described in (i) of FIG. 6).

As described above, the total injection amount is calculated so as to maintain the in-cylinder air-fuel ratio at the slightly rich air-fuel ratio in each cycle during the catalyst warming-up control. When the injection amount in the expansion stroke injection is reduced, the injection amount in the intake stroke injection is increased. Therefore, the concentration of the air-fuel mixture for generating the initial flame can be increased to suppress the increase in the combustion fluctuation. On the contrary, when the injection amount in the expansion stroke injection is increased, the injection amount in the intake stroke injection is reduced. Therefore, the concentration of the air-fuel mixture for generating the initial flame can be reduced to suppress the increase in the combustion fluctuation. When the injection amount in the expansion stroke injection is increased, the above-described attraction action can be enhanced to suppress the increase in the combustion fluctuation. Thus, according to the present embodiment, when it is estimated that the combustion fluctuation between cycles increases, the injection amount in the expansion stroke injection or the ratio of the expansion stroke injection to the total injection amount can be changed, thereby preventing the drivability during the catalyst warming-up control from being affected.

[Specific Process in First Embodiment]

Figure 7:
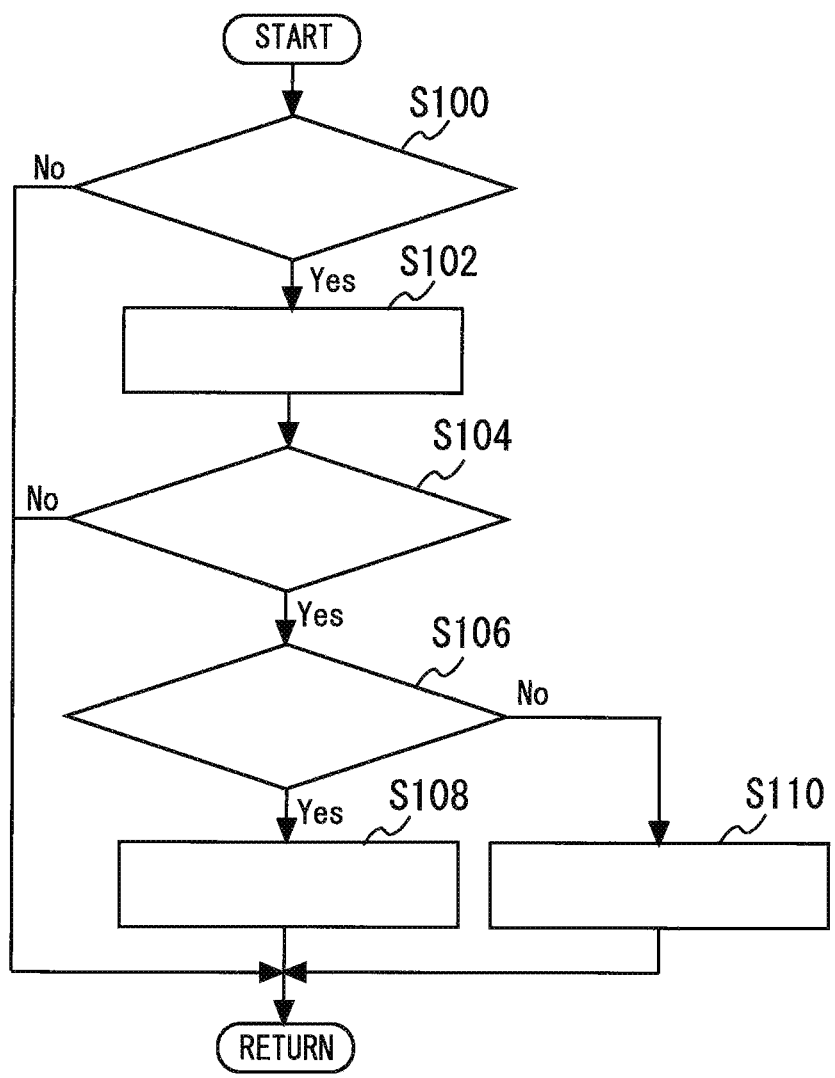
FIG. 7 is a flowchart illustrating an example of a process performed by an ECU 40 in the first embodiment of the present disclosure.

FIG. 7 is a flowchart illustrating an example of a process performed by the ECU 40 in the first embodiment of the present disclosure. Note that routines illustrated in this figure are repeatedly performed in each cylinder by cycle after starting-up of the internal combustion engine 10.

In the routines illustrated in FIG. 7, first, it is determined whether the engine coolant temperature is below a threshold Tcat (step S100). In step S100, the engine coolant temperature in accordance with the detection value of the temperature sensor 46 is compared with the threshold Tcat (as an example, 30 to 40° C.). When it is determined that the engine coolant temperature is equal to or higher than the threshold Tcat (in a case of "No"), the activation of the exhaust gas cleaning catalyst can be determined to be unnecessary, and the process goes out of this routine. On the other hand, when it is determined that the engine coolant temperature is below the threshold Tcat (in a case of "Yes"), the activation of the exhaust gas cleaning catalyst can be determined to be necessary, and the catalyst warming-up control is started (step S102).

Subsequently to step S102, it is determined whether the engine speed fluctuation is large (step S104). In step S104, for example, an average of times required in the expansion strokes in past several cycles before the current cycle is calculated as the engine speed fluctuation, and the calculated average value is compared with a threshold Necov. When it is determined that the average value is equal to or less than the threshold Necov (in a case of "No"), it can be estimated that the combustion fluctuation between cycles does not increase, and the process goes out of this routine. On the other hand, when it is determined that the average value is larger than the threshold Necov (in a case of "Yes"), it can be estimated that the combustion fluctuation between cycles increases, and the process proceeds to step S106.

Figure 8:
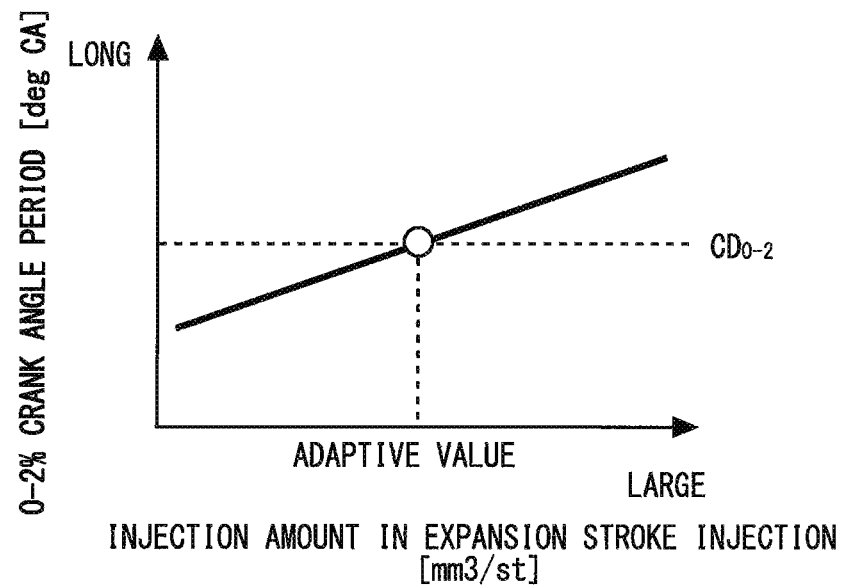
FIG. 8 is a graph showing an example of a threshold $CD_{0-2}$.

In step S106, it is determined whether the SA-CA2 is larger than a threshold $CD_{0-2}$. FIG. 8 is a graph showing an example of the threshold $CD_{0-2}$. As shown in FIG. 8, the SA-CA2 (an ordinate of FIG. 8) is longer as the injection amount in the expansion stroke injection is increased. This is because under a condition that the in-cylinder air-fuel ratio is constant, the injection amount in the intake stroke injection is smaller as the injection amount in the expansion stroke injection is larger, resulting in the time being required until the combustion mass ratio (MFB) becomes 2%. The threshold $CD_{0-2}$ is set to a value of the SA-CA2 obtained when the injection amount in the expansion stroke injection is the initial value (adaptive value).

When it is determined that the SA-CA2 is larger than the threshold $CD_{0-2}$ in step S106 (in a case of "Yes"), it can be estimated that the ignition delay for the initial flame is increased from that before the increase in the combustion fluctuation between cycles, and therefore the injection amount in the expansion stroke injection is reduced in the next time cycle (step S108). On the other hand, when the SA-CA2 is equal to or less than the threshold $CD_{0-2}$ (in a case of "No"), it can be estimated that the ignition delay for the initial flame is reduced from that before the increase in the combustion fluctuation between cycles, and therefore the injection amount in the expansion stroke injection is increased in the next time cycle (step S110).

According to the above described routines illustrated in FIG. 7, when it is estimated that the combustion fluctuation between cycles increases, the injection amount in the expansion stroke injection in the next time cycle or the ratio of the expansion stroke injection to the total injection amount in the next time cycle can be changed according to a result of estimating whether the ignition delay for the initial flame is increased from that before the increase in the combustion fluctuation between cycles. Accordingly, the combustion fluctuation between cycles during the catalyst warming-up control can be suppressed, thereby preventing the drivability from being affected.

[Modification of First Embodiment]

In the first embodiment, the tumble flow formed in the combustion chamber 20 swirls from the upper part of the combustion chamber 20 downward at the exhaust port 24 side and from the lower part of the combustion chamber 20 upward at the intake port 22 side. However, the tumble flow may swirl in a direction opposite to this flow direction, that is, the tumble flow may swirl from the upper part of the combustion chamber 20 downward at the intake port 22 side and from the lower part of the combustion chamber 20 upward at the exhaust port 24 side. In this case, it is necessary to change a location of the spark plug 32 from the exhaust valve 28 side to the intake valve 26 side. By thus changing the location of the spark plug 32, the spark plug 32 is located on the downstream side of the injector 30 in the tumble flow direction, thereby achieving the attraction action by the expansion stroke injection. Note that this modification can be similarly applied to a second embodiment described later.

In the first embodiment, the first time injection (first injection) by the injector 30 is performed in the intake stroke, and the second time injection (second injection) is performed in the expansion stroke at the timing retarded from the compression top dead center. However, the first time injection (first injection) may be also performed in the compression stroke. In addition, the first time injection (first injection) may be dividedly performed in a plurality of times, or a divided part of the first time injection may be also performed in the intake stroke and the remainder may be also performed in the compression stroke. Thus, the injection timing and the number of injections in the first time injection (first injection) may be modified in various ways. Note that this modification can be similarly applied to the second embodiment described later.

In the first embodiment, the increase in the combustion fluctuation between cycles is estimated using the engine speed fluctuation. However, the combustion fluctuation can be also estimated using combustion pressure fluctuation and torque fluctuation, for example. The combustion pressure can be detected in accordance with a detection signal of a combustion pressure sensor installed in the combustion chamber 20, for example. The torque fluctuation can be detected in accordance with a detection signal of a strain gauge type torque meter installed in the combustion chamber 20. Note that this modification can be similarly applied to the second embodiment described later.

In the first embodiment, the estimation related to the ignition delay for the initial flame is performed using the SA-CA2. However, the estimation related to the ignition delay for the initial flame may be also performed using a crank angle period CA0-CA10 (hereinafter also referred to as an "SA-CA10") from a start point of the initial combustion (crank angle CA0) to a combustion point when the combustion mass ratio (MFB) becomes 10% (crank angle CA10). The relationship between the SA-CA10 and the injection amount in the expansion stroke injection is substantially equal to the relationship between the SA-CA2 illustrated in FIG. 8 and the injection amount in the expansion stroke injection. The estimation related to the ignition delay for the initial flame may be performed even if using the SA-CA10. Note that this modification can be similarly applied to the second embodiment described later.

Figure 9:
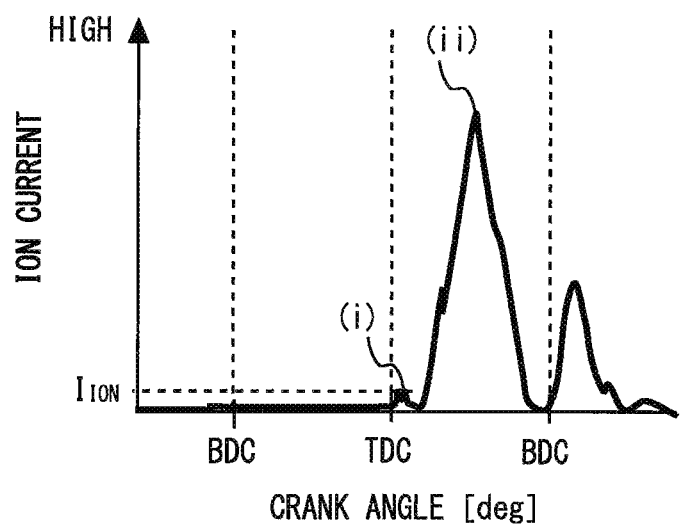
FIG. 9 is a graph showing an estimation method related to an ignition delay for initial flame using an ion current.

The estimation related to the ignition delay may be also performed by detecting ions generated in the combustion chamber 20 as an ion current flowing in the electrode part 34 and using the ion current, for example. FIG. 9 is a graph showing an estimation method related to the ignition delay for the initial flame using the ion current. As shown in FIG. 9, iron current waveforms include a waveform (i) observed at a timing that the initial flame reaches the bottom surface of the cylinder head in a vicinity of the spark plug, and a waveform (ii) observed at a timing that the grown initial flame reaches the wall surface of the cylinder block apart from the spark plug. The ion current $I_{ION}$ corresponding to the waveform (i) is higher as the injection amount in the intake stroke injection is increased. Therefore, the estimation related to the ignition delay for the initial flame can be performed even if using the ion current $I_{ION}$ corresponding to the waveform (i). Note that this modification can be similarly applied to the second embodiment described later.

SECOND EMBODIMENT

Next, the second embodiment of the present disclosure is described with reference to FIGS. 10 and 11.

Note that the present embodiment is based on the assumption that the system configuration illustrated in FIG. 1 is applied. Therefore, the descriptions thereof are omitted.

[Countermeasures when Combustion Fluctuation Increases]

In the first embodiment, when it is estimated that the ignition delay for the initial flame is reduced from that before the increase in the combustion fluctuation between cycles, the injection amount in the expansion stroke injection is increased. In the present embodiment, when it is estimated that the ignition delay for the initial flame is reduced from that before the increase in the combustion fluctuation between cycles, the estimation related to this cause is performed in accordance with a secondary voltage of the spark plug 32.

Figure 10:
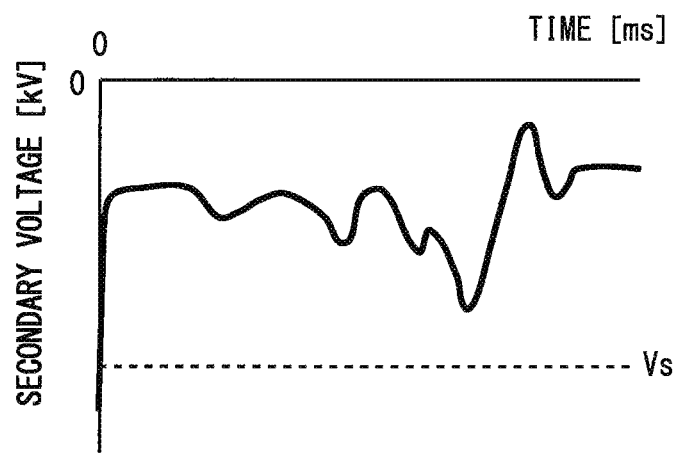
FIG. 10 is graphs each showing an example of a discharge waveform of a spark plug during the catalyst warming-up control.
Figure 10:
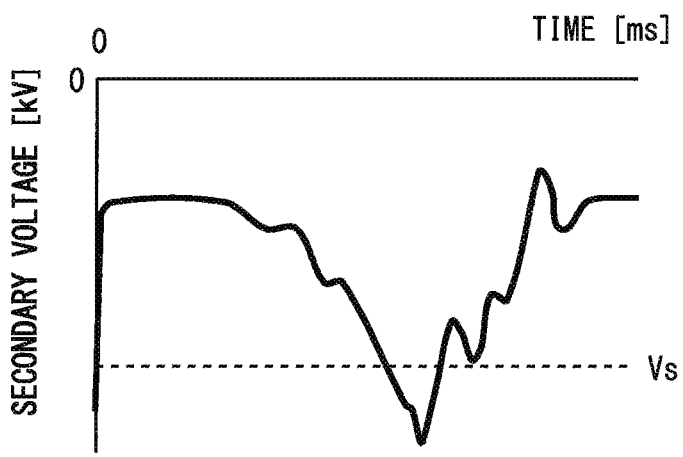

FIG. 10 is graphs each showing an example of a discharge waveform of the spark plug during the catalyst warming-up control. An upper side graph and a lower side graph in FIG. 10 are common in that the secondary voltage generated by the spark plug starts dropping from a certain time. When the secondary voltage during dropping reaches the discharge voltage of the spark plug, a discharge spark is generated by the electrode part of the spark plug. As being understood by comparing between the upper side graph and the lower side graph in FIG. 10, the secondary voltage in the lower side graph drops more significantly than the secondary voltage in the upper graph. This is because the attraction action illustrated in FIG. 4 is enhanced. When the attraction action illustrated in FIG. 4 is strong, not only the discharge spark generated by the electrode part but also the initial flame generated by the contact of the fuel spray injected by the intake stroke injection with the discharge spark are strongly attracted to the low pressure area formed around the fuel spray injected by the expansion stroke injection.

When the estimation related to the ignition delay for the initial flame is performed using the SA-CA2, even if it can be estimated that the ignition delay for the initial flame is reduced from that before the increase in the combustion fluctuation between cycles, it is difficult to specify that the cause is that the concentration of the air-fuel mixture for generating the initial flame is higher than required or that the above-described attraction action is weakened due to the hardware tolerance. Similarly, even if the SA-CA10 and the ion current described above are used, it is difficult to specify the cause. However, if a value of the secondary voltage when the secondary voltage drop is maximized (hereinafter referred to as "maximum drop voltage") as shown in FIG. 10 is used, the cause can be specified.

If the cause of the reduction of the ignition delay for the initial flame is due to the hardware tolerance, it is foreseeable that the above-described attraction action would be weakened not only in this time cycle but also in next time cycle. In the present embodiment, when it is determined that the maximum drop voltage is smaller than a threshold Vs (setting value), the control device increases the injection amount in the expansion stroke injection and performs the learning for correcting the injection amount stored in the ROM of the ECU 40 to the increased injection amount. When the correction of the injection amount is performed for the first time after the injection amount is increased, the injection amount stored in the ROM of the ECU 40 becomes the above-described initial value (adaptive value). When the control device performs the learning for correcting the injection amount to the increased amount, the expansion stroke injection is performed in accordance with the reflected injection amount in the next time cycle, thereby suppressing the combustion fluctuation between cycles in the next time cycle or later.

On the other hand, if the cause of the reduction of the ignition delay for the initial flame is due to the high concentration of the air-fuel mixture, the high concentration may be caused only in this time cycle, and the concentration may be stable in the next time cycle or later. In the present embodiment, when determining that the maximum drop voltage is equal to or larger than the threshold Vs, the control device decreases the injection amount in the expansion stroke injection and prohibit learning described above. The expansion stroke injection in the next time cycle can be performed with the increased injection amount, thereby suppressing the combustion fluctuation between cycles in the next time cycle or later.

According to the present embodiment, the cause of the reduction of the ignition delay for the initial flame can be specified by comparison of the maximum drop voltage and the threshold Vs. When the cause is due to the hardware tolerance, the control device performs the learning for correcting to the increased injection amount, thereby suppressing the increase in the combustion fluctuation in the next time cycle or later.

[Specific Process in Second Embodiment]

Figure 11:
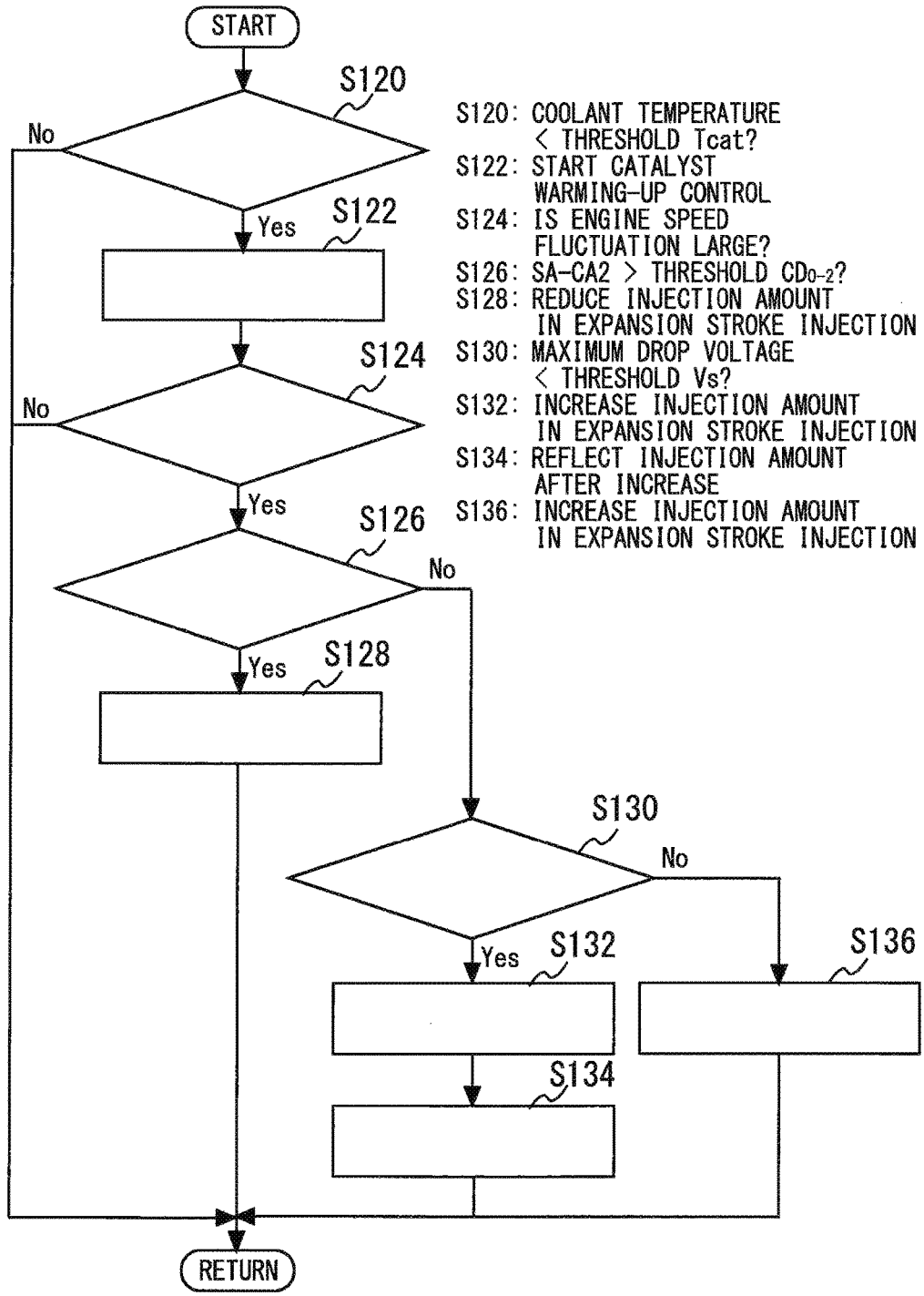
FIG. 11 is a flowchart illustrating an example of a process performed by an ECU 40 in a second embodiment of the present disclosure.

FIG. 11 is a flowchart illustrating an example of a process performed by the ECU 40 in the second embodiment of the present disclosure. Note that routines depicted in this figure are repeatedly performed in each cylinder by cycle after starting-up of the internal combustion engine 10.

Process contents of steps S120 to S126 of the routines illustrated in FIG. 11 are identical to those in steps S100 to S106 of the routines depicted in FIG. 7. Therefore, the descriptions thereof are omitted. The following are the descriptions after the determination in step S126.

When it is determined that the SA-CA2 is larger than the threshold $CD_{0-2}$ in step S126 (in a case of "Yes"), it can be estimated that the ignition delay for the initial flame is increased from that before the increase in the combustion fluctuation, and therefore the injection amount in the expansion stroke injection is reduced in the next time cycle (step S128). On the other hand, when the SA-CA2 is equal to or less than the threshold $CD_{0-2}$ (in a case of "No"), it can be estimated that the ignition delay for the initial flame is reduced from that before the increase in the combustion fluctuation between cycles, and the process proceeds to step S130.

In step S130, it is determined whether the maximum drop voltage is smaller than the threshold Vs. The maximum drop voltage can be obtained by measuring a secondary voltage waveform of the spark plug 32. When it is determined the maximum drop voltage is smaller than the threshold Vs, it can be estimated that the above-described attraction action is weakened due to the hardware tolerance. Therefore, the injection amount in the expansion stroke injection is increased in the next time cycle (step S132), and the increased injection amount is reflected on the injection amount stored in the ROM of the ECU 40 (step S134). On the other hand, when it is determined that the maximum drop voltage is equal to or larger than the threshold Vs, it can be estimated that the concentration of the air-fuel mixture for generating the initial flame is higher than required. There-fore, the injection amount in the expansion stroke injection in the next time cycle is increased (step S136).

According to the above-described routines in FIG. 11, when it is estimated that the combustion fluctuation between cycles is increased, the injection amount in the expansion stroke injection in the next time cycle or the ratio of the expansion stroke injection to the total injection amount in the next time cycle can be changed according to a result of estimating whether the ignition delay for the initial flame is increased from that before the increase in the combustion fluctuation between cycles. Accordingly, the combustion fluctuation between cycles during the catalyst warming-up control can be suppressed, thereby preventing the drivability from being affected. According to the routines depicted in FIG. 11, when it is determined that the maximum drop voltage is smaller than the threshold Vs, the increased injection amount can be reflected on the injection amount stored in the ROM of the ECU 40. Accordingly, the combustion fluctuation between cycles in the next time cycle or later can be suppressed.

What is claimed is:

1. A control device for controlling an internal combustion engine, the internal combustion engine comprising:
   an injector which is provided in an upper part of a combustion chamber and is configured to inject fuel directly into a cylinder;
   a spark plug which is configured to ignite an air-fuel mixture in the cylinder using a discharge spark, the spark plug being provided in the upper part of the combustion chamber and on a downstream side of the injector in a flow direction of a tumble flow formed in the combustion chamber, and being located above a contour surface of a fuel spray pattern injected from the injector toward the spark plug; and
   an exhaust gas cleaning catalyst which is configured to clean an exhaust gas from the combustion chamber,
   wherein in order to activate the exhaust gas cleaning catalyst, the control device is configured to control the spark plug so as to generate a discharge spark in an ignition period retarded from a compression top dead center, and control the injector so as to perform a first injection at a timing advanced from the compression top dead center and a second injection at a timing retarded from the compression top dead center, the second injection being performed so that an injection period overlaps with at least a part of the ignition period, and
   the control device further is configured to set to a target air-fuel ratio an in-cylinder air-fuel ratio which is calculated in each cycle in accordance with a sum of an injection amount of the first injection and an injection amount of the second injection whose initial value is fixed, perform estimation related to a combustion fluctuation between cycles, and when it is estimated that the combustion fluctuation between cycles increases, change a ratio of the injection amount of the first injection and the injection amount of the second injection to the sum in accordance with an index correlated with an ignition delay for an initial flame generated from the discharge spark and the air-fuel mixture containing a fuel spray injected by the first injection.

2. The control device for an internal combustion engine according to claim 1, wherein the control device is further configured to:
   estimate in accordance with the index whether the ignition delay for the initial flame is reduced from that before an increase in the combustion fluctuation between cycles;

change to increase a ratio of the second injection amount to the sum when it is estimated that the ignition delay for the initial flame is reduced from that before the increase in the combustion fluctuation between cycles; and change to reduce the ratio of the second injection amount to the sum when it is estimated that the ignition delay for the initial flame is increased from that before the increase in the combustion fluctuation between cycles.

3. The control device for an internal combustion engine according to claim 2, wherein the control device is further configured to:

determine whether a minimum value of a secondary voltage of the spark plug which drops during the ignition period is smaller than a threshold when it is estimated that the ignition delay for the initial flame is reduced from that before the increase in the combustion fluctuation between cycles;

perform learning of the second injection amount in accordance with the ratio after the second injection amount to the sum is changed when determining that the minimum value is smaller than the threshold; and prohibit learning of the second injection amount when determining that the minimum value is equal to or larger than the threshold.

* * * * *